(12) United States Patent
Khasiev

(10) Patent No.: US 7,576,446 B2
(45) Date of Patent: Aug. 18, 2009

(54) ZERO VOLTAGE SWITCHING (ZVS) IN A POWER CONVERTER

(75) Inventor: Vladimir Khasiev, Livermore, CA (US)

(73) Assignee: Fairchild Semiconductor Corporation, South Portland, ME (US)

( * ) Notice: Subject to any disclaimer, the term of this patent is extended or adjusted under 35 U.S.C. 154(b) by 329 days.

(21) Appl. No.: 11/313,583

(22) Filed: Dec. 20, 2005

(65) Prior Publication Data

US 2007/0138871 A1    Jun. 21, 2007

(51) Int. Cl.
*H02J 1/00* (2006.01)
*H02J 3/00* (2006.01)

(52) U.S. Cl. .......................................... 307/11; 307/58
(58) Field of Classification Search ................... 307/11, 307/31, 17, 58; 363/40, 130, 89, 140
See application file for complete search history.

(56) References Cited

U.S. PATENT DOCUMENTS

| | | | |
|---|---|---|---|
| 5,418,704 A | | 5/1995 | Hua et al. |
| RE36,571 E | * | 2/2000 | Rozman ................... 363/21.06 |
| 7,330,360 B2 | * | 2/2008 | Lee et al. ................. 363/21.12 |

* cited by examiner

*Primary Examiner*—Albert W Paladini
*Assistant Examiner*—Carlos Amaya
(74) *Attorney, Agent, or Firm*—Sidley Austin LLP

(57) ABSTRACT

In one embodiment, a power converter includes a first switch in a main power loop for delivering power to a first load. A second switch in an auxiliary power loop delivers power to a second load. The power converter system further includes means for providing zero voltage switching (ZVS) conditions for both the first and second switches during operation of the power converter system.

15 Claims, 5 Drawing Sheets

US 7,576,446 B2

ZERO VOLTAGE SWITCHING (ZVS) IN A POWER CONVERTER

BACKGROUND

1. Field of Invention

The present invention relates to power conversion, and more particularly, to a zero voltage switching in a power converter.

2. Description of Related Art

Power converters are essential for many modern electronic devices. Among other capabilities, power converters can adjust power level downward (buck converter) or adjust power level upward (boost converter). Power converters are typically implemented using one or more switching devices, such as transistors, which are turned on and off to deliver power to the output of the converter. When such converters are operated at high frequencies, substantial losses may occur. It is desirable to reduce or minimize such losses.

SUMMARY

According to an embodiment of the present invention, a power converter includes a first switch in a main power loop for delivering power to a first load. A second switch in an auxiliary power loop delivers power to a second load. The power converter system further includes means for providing zero voltage switching (ZVS) conditions for both the first and second switches during operation of the power converter system.

According to another embodiment of the present invention, a power converter system includes a first switch in a main power loop for delivering power to a first load. A second switch in an auxiliary power loop delivers power to a second load. A transformer is coupled to the first and second switches and has a primary winding and a secondary winding. The primary winding stores energy sufficient to provide zero voltage switching (ZVS) conditions for both the first and second switches during operation of the power converter system.

According to yet another embodiment of the present invention, a double ended boost converter includes a voltage source. A first switch, connected between the voltage source and a first load, is operable to be turned on and turned off for delivering power to the first load. A second switch is operable to be turned on and turned off for delivering power to a second load. The converter includes means for reducing a voltage across each of the first switch and the second switch to substantially zero prior the respective switch being turned off.

According to still yet another embodiment of the present invention, a power converter system includes a voltage source. A first switch, connected between the voltage source and a first load, is operable to be turned on and turned off for delivering power to the first load. A second switch is operable to be turned on and turned off for delivering power to a second load. A transformer is coupled to the first and second switches and has a primary winding and a secondary winding. In one stage of operation for the power converter system, a magnetizing inductance of the primary winding resonates with a capacitance which is equal to the combination of a capacitance of the first switch and any additional or parasitic capacitance around the first switch. In another stage of operation for the power converter system, a magnetizing inductance of the primary winding resonates with a capacitance which is equal to the combination of a capacitance of the second switch and any additional or parasitic capacitance around the second switch.

Important technical advantages of the present invention are readily apparent to one skilled in the art from the following figures, descriptions, and claims.

BRIEF DESCRIPTION OF DRAWINGS

For a more complete understanding of the present invention and for further features and advantages, reference is now made to the following description taken in conjunction with the accompanying drawings.

DETAILED DESCRIPTION

Embodiments of the present invention and their advantages are best understood by referring to FIGS. 1 through 4 of the drawings. Like numerals are used for like and corresponding parts of the various drawings.

Figure 1:
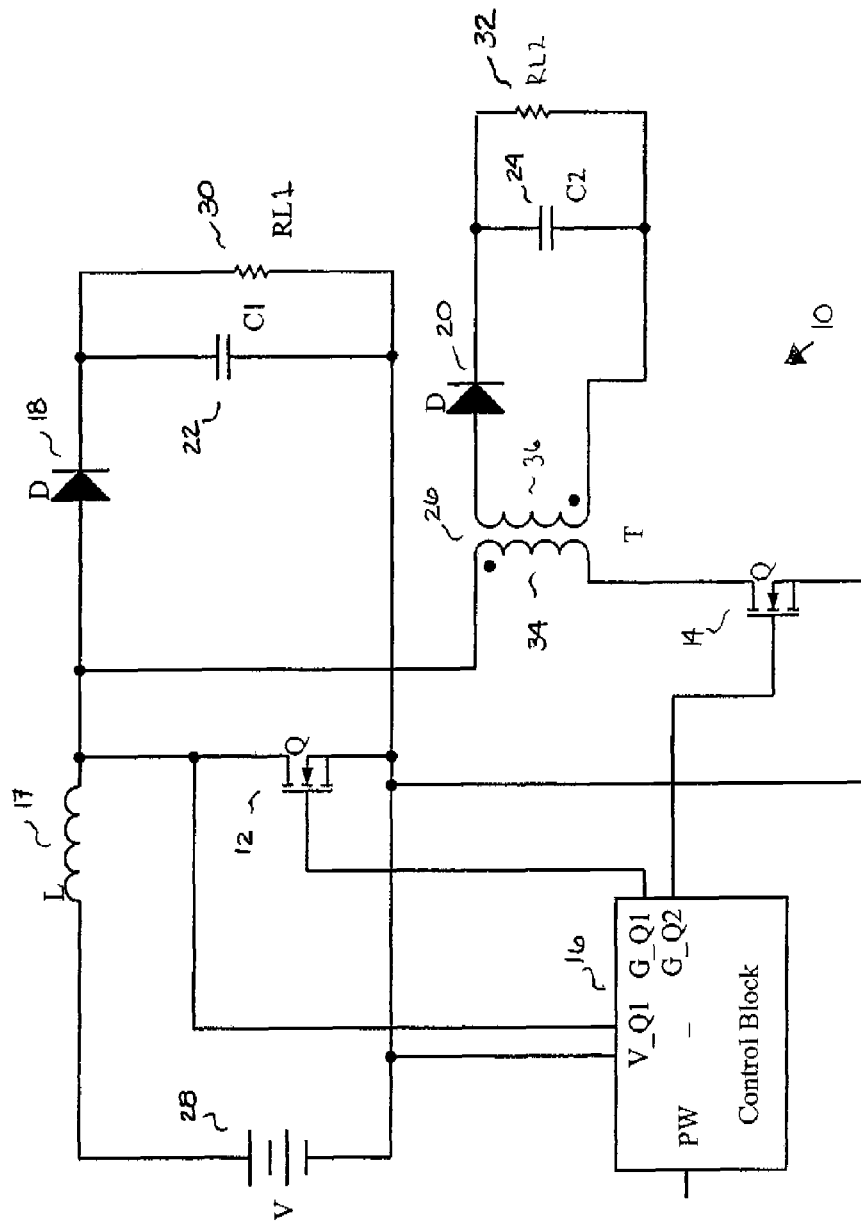
FIG. 1 is a schematic diagram in partial block form of a power converter system, according to an embodiment of the invention.

FIG. 1 is a schematic diagram in partial block form of a power converter system 10, according to an embodiment of the invention. Power converter system 10 can be a system having a fixed input and output voltage (and fixed duty cycle), for example, an uninterruptible power switch (UPS). As depicted, power converter system 10 includes transistors or switches 12, 14, control block 16, inductor 17, diodes 18, 20, capacitors 22, 24, transformer 26, power source 28, and loads 30, 32.

In one embodiment, power source 28 is implemented as a voltage supply which provides a voltage at a particular level. Switches 12 and 14 may be each implemented as a metal-oxide-semiconductor field effect transistor (MOSFET), but it is understood that these transistor can be implemented with other suitable devices such as, for example, bipolar junction transistors (BJTs), insulated gate field effect transistors (IG-FETs), insulated gate bipolar transistors (IGBTs), etc. Each of diodes 18 and 20 can be implemented as low power Schottky diodes.

Switch 12, inductor 17, diode 18, and capacitor 22 implement a main power loop or circuit which delivers power to load 30, which is depicted as a resistor RL1. The main power loop of system 10 may boost the voltage from power source 28 to a higher level. In particular, the value of the voltage across capacitor 22 is greater than the value of the voltage from power source 28 (e.g., four times greater).

Switch 14, transformer 26, diode 20, and capacitor 24 implement an auxiliary power loop or circuit which delivers power to load 32, depicted as a resistor RL2. In this embodiment, the auxiliary power loop is essentially a flyback converter. The size or magnitude of the power of load 30 may be significantly greater than that of power of load 32 (i.e., RL1>>RL2). Transformer 26, which has a primary winding 34 and a secondary winding 36, may be used as a flyback transformer in power converter system 10.

Control block 16 controls the turning on and turning off of switches 12 and 14. Control block 16 can be implemented with any suitable circuitry which implements the functionality described herein. In one embodiment, the control block 16 can be implemented in an integrated circuit (IC) device. Control block 16 receives as input a pulse width modulation (PWM) signal and a V_Q1 signal. The V_Q1 signal can be taken from one terminal (e.g., drain) of switch 12. Control block 16 outputs control signals G_Q1 and G_Q2, which are applied to the control terminals or gates of switches 12 and 14. An exemplary implementation for control block 16 is shown and described with reference to FIG. 4.

In operation, the control block 16 outputs signals which cause the switch 12 of the main power loop to alternately turn on and off. When switch 12 is turned on, no current flows through diode 18. When switch 12 is turned off, energy stored in inductor 17 causes current to flow through diode 12, and charge is stored in capacitor 22. As switch 12 is alternately turned on and off, the charge in capacitor 22 is built up so that the value of the voltage across the capacitor 22 is greater than the value of the voltage of the power source 28. This voltage across capacitor 22 is delivered to the load 30 of the main power loop. As such, power converter system 10 functions as a boost converter which boosts the voltage output from the power source 28 up to a higher value.

The switching on and off of switch 12 also causes current to flow through the primary winding 34 of transformer 26 in the auxiliary power loop. This causes a current to flow in the secondary winding 36 of the transformer, which in turn, causes charge to build up in capacitor 24. The voltage across capacitor 24 which is created by this charge build-up is delivered to the load 32 of the auxiliary power loop.

The power converter system 10 may operate as a double-ended converter. The magnetic flux swing in the primary winding 34 of transformer 26 is bi-directional. That is, the transformer is being actively driven in two directions.

During operation of power converter system 10, embodiments of the present invention provide zero voltage switching (ZVS) conditions for both of the switches 12 and 14 in power converter system 10. That is, switching transitions are performed at, or close to, zero voltage across the switches 12 and 14 (i.e., Vds is approximately zero). In one embodiment, the energy stored in the inductance of transformer 26 is sufficient to facilitate ZVS on both switches 12 and 14 by discharging parasitic body capacitances of these switches before they turn on. ZVS conditions on both switching devices eliminates or reduces reverse recovery current and the associated losses in high voltage applications. Thus, embodiments of the present invention improve efficiency on a power converter system.

Figure 2:
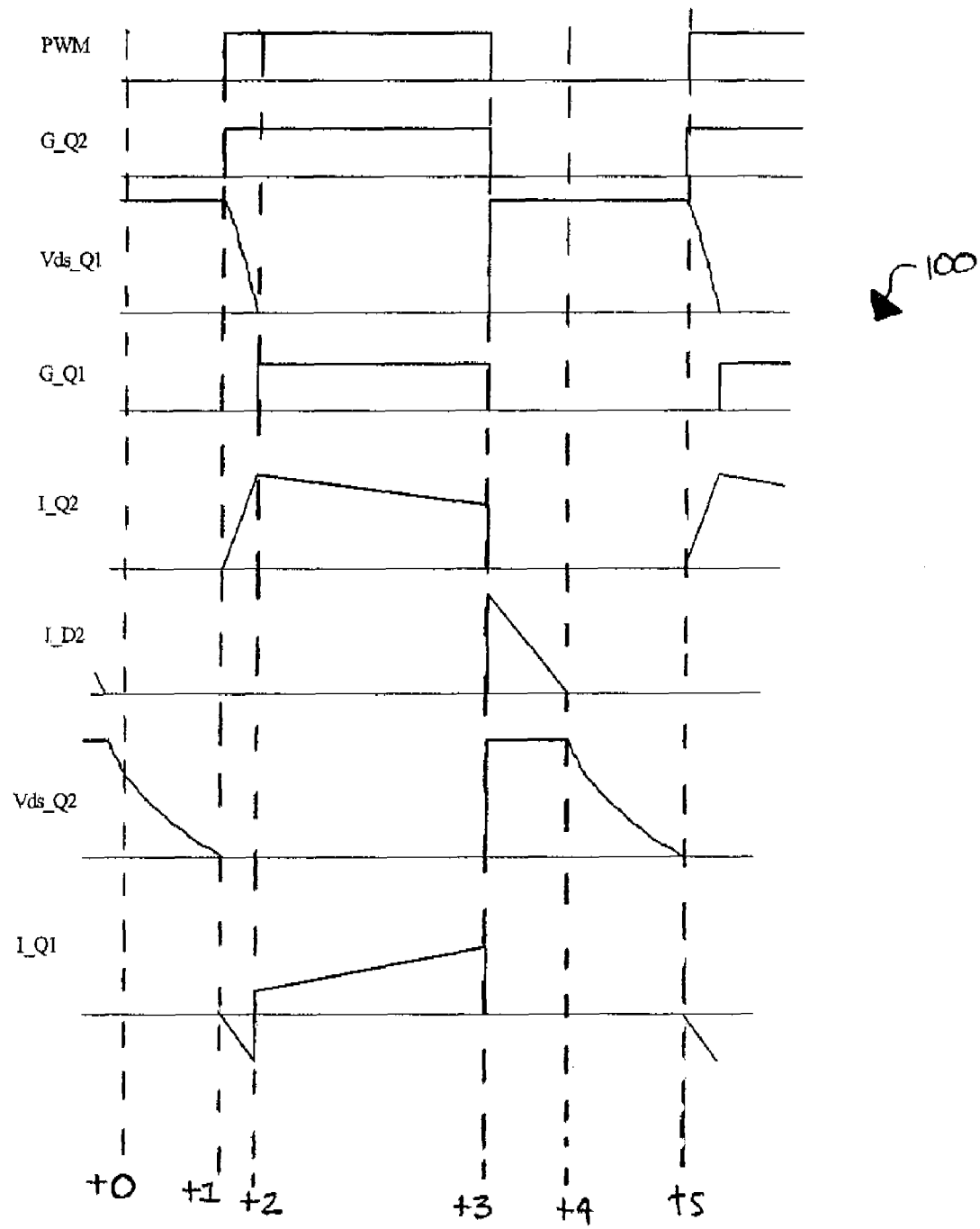
FIG. 2 is an exemplary waveform diagram for a power converter system, according to an embodiment of the invention.

The operational stages for power converter system 10 are described with reference to FIGS. 2 and 3A-3E. FIG. 2 is an exemplary waveform diagram 100 for system 10, according to an embodiment of the invention. FIGS. 3A-3E are simplified, equivalent circuit diagrams for the power converter system 10 during various points in its cycle of operation, according to embodiments of the invention.

Figure 3A:
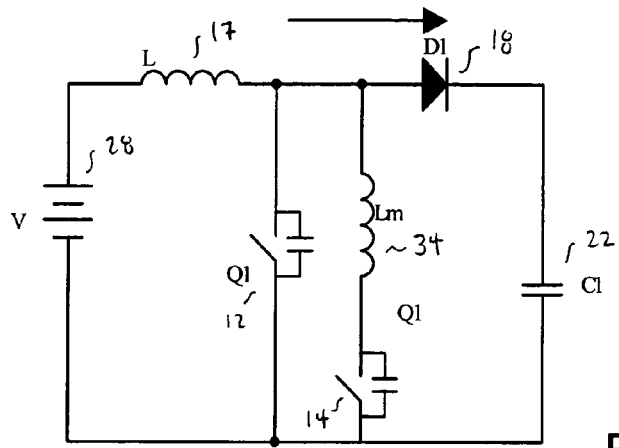
FIGS. 3A-3D are simplified, equivalent circuit diagrams for the power converter system during various points of operation, according to embodiments of the invention.

Referring to FIG. 2, from time t0 to time t1, both of switches 12 and 14 are turned off (or open). There is some voltage potential from drain to source of these transistors (i.e., Vds_Q1 and Vds_Q2). Each of switches 12 and 14 have a respective body capacitance. Diode 18 in the main power loop is on, and current flows therethrough. Diode 20 is off. The equivalent circuit diagram for system 10 for time t0 to time t1 is shown in FIG. 3A.

Figure 3B:
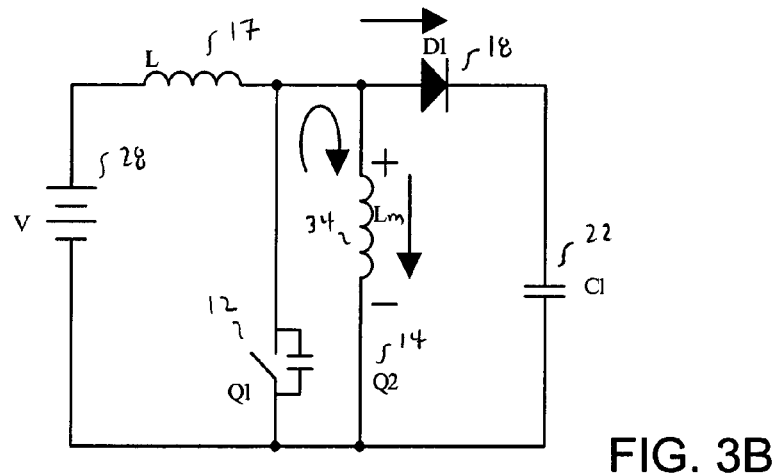

From time t1 to time t2, control block 16 provides a value for control signal (G_Q2) which turns on the switch 14. Diode 20 is off. Primary winding 34 functions as an inductor (Lm). The magnetizing inductance of the primary winding 34 resonates with a capacitance (Czvs1) which is equal to the combination of capacitance of switch 12 (Coss1) and any additional or parasitic capacitance around switch 12 (Cpr1). That is, there are parallel resonant conditions between the capacitance (Czvs1) of primary winding 34 (acting as an inductor) and the combination of capacitance of switch 12 (Coss1) and any additional or parasitic capacitance around switch 12 (Cpr1). This reduces the voltage across switch 12 (Vds_Q1) to at or near 0V before switch 12 is turned on. In other words, the energy stored in inductor (Lm) facilitates a zero voltage transition for switch 12. The current (I_Q2) flowing through the primary winding 34 (inductor (Lm)) of transformer 26 increases. The power converter system 10 is in continuous conduction mode (CCM)—i.e., current in the energy transfer inductor 17 never goes to zero between switching cycles. The equivalent circuit diagram for system 10 for time t1 to time t2 is shown in FIG. 3B. The relevant equations for system 10 are:

$$fr1 = \frac{1}{2*\pi*\sqrt{Lm*Czvs1}}$$

$$Czvs1 = Coss1 + Cpr1$$

where fr1 is the frequency of the inductor (Lm).

Figure 3C:
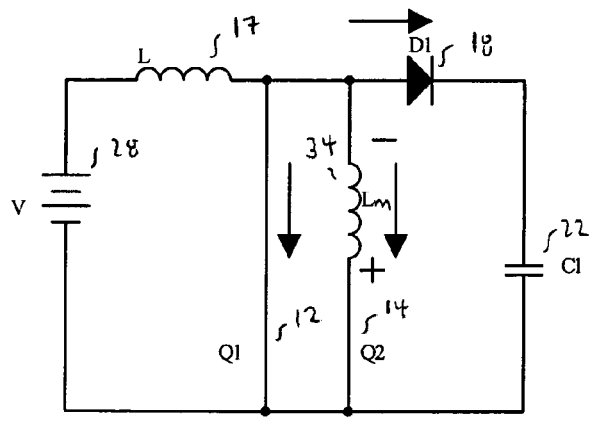

From time t2 to time t3, switch 14 continues to be turned on. With the voltage across switch 12 at or near zero, control block 16 provides a value for control signal (G_Q1) to turn on the switch 12. As such, there is zero voltage switching for switch 12. The current flowing in the inductor 17 increases. The current (I_Q1) flowing through switch 12 increases. The current (I_Q2) flowing through switch 14 decreases. The equivalent circuit diagram for system 10 for time t2 to time t3 is shown in FIG. 3C.

Figure 3D:
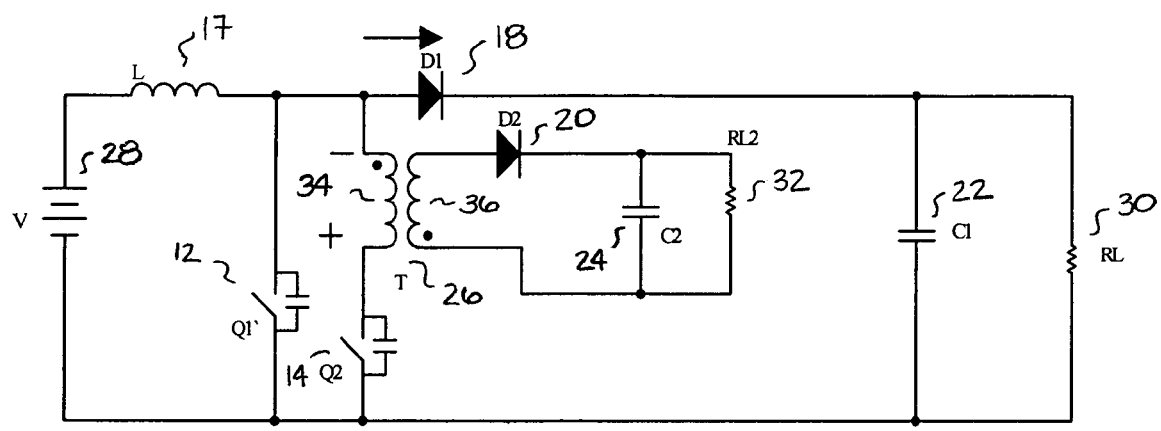

From time t3 to time t4, control block 16 provides values for signals (G_Q1 and G_Q2) to turn off switches 12 and 14. No current (I_Q1 and I_Q2) flows through the switches. The diode 20 is on. Energy is transferred from the primary winding 34 of transformer 26 to the secondary winding 36, and then on to the load 32 (RL2) through diode 20. The equivalent circuit diagram for system 10 for time t3 to time t4 is shown in FIG. 3D.

From time t4 to time t5, after all energy is transferred, there are parallel resonant conditions between the capacitance (Czvs2) of primary winding 34 (acting as an inductor) and the combination of capacitance of switch 14 (Coss2) and any additional or parasitic capacitance around switch 14 (Cpr2). This reduces the voltage across switch 14 (Vds_Q2) to at or near 0V. This can be accomplished, for example, by setting the parameters of the transformer 26 (Lm), capacitor 24, and parasitic capacitance such that there is little or no oscillation in the voltage across switch 14 at the end of the time that switch 14 is turned off; instead, the voltage across switch 14 falls to zero. Accordingly, zero voltage switching (ZVS) conditions can be created for switch 14. The equivalent circuit diagram for system 10 for time t4 to time t5 is the same as that for time t3 to time t4 (shown in FIG. 3D). The relevant equations for system 10 are:

$$fr2 = \frac{1}{2*\pi*\sqrt{Lm*Czvs2}}$$

$$Czvs2 = Coss2 + Cpr1$$

where fr2 is the frequency of the inductor (Lm).

After time t5, the cycle of operation for power converter system 10 may repeat.

Figure 4:
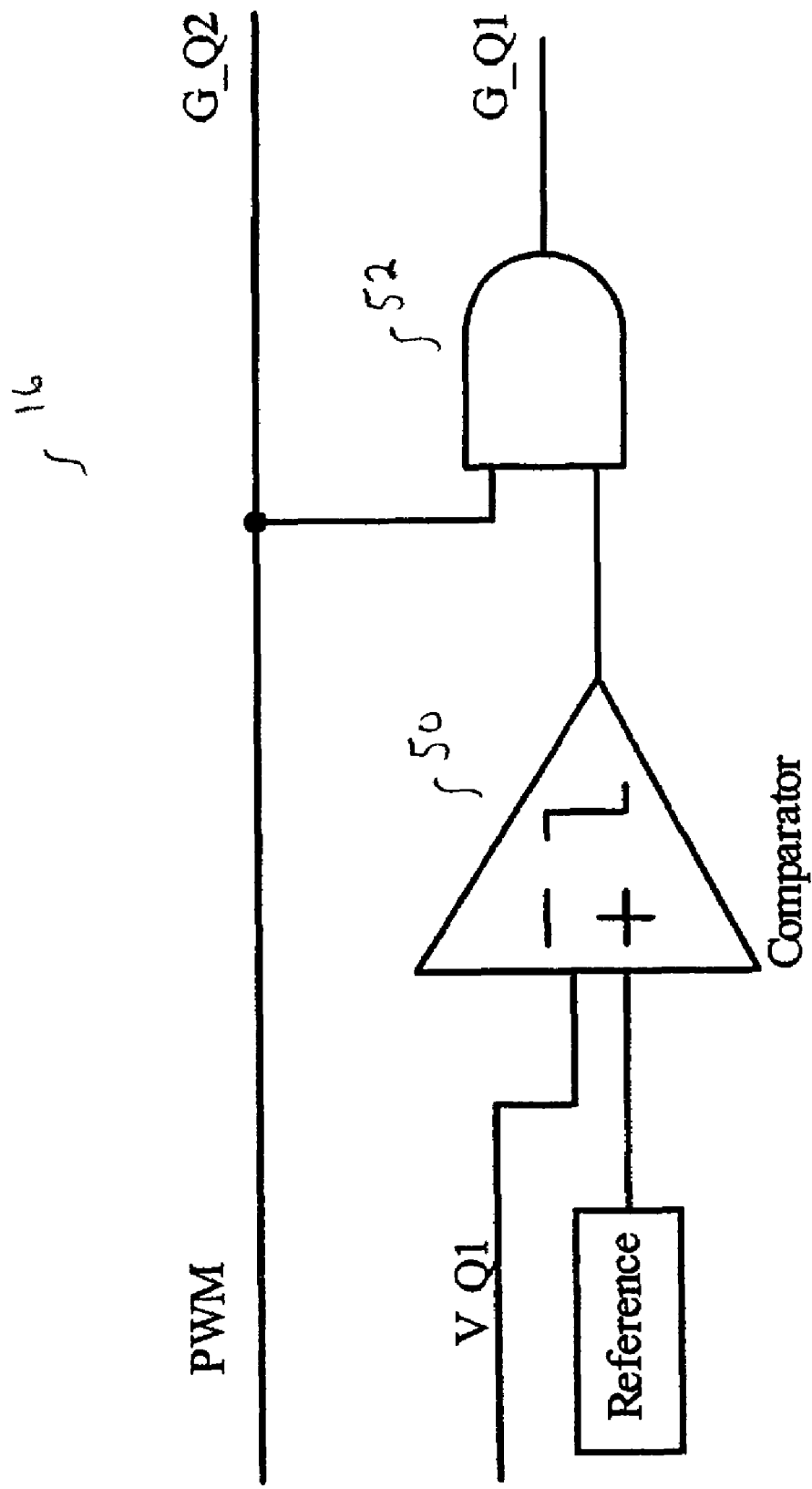
FIG. 4 is a schematic diagram of an exemplary implementation for a control block, according to an embodiment of the invention.

FIG. 4 is a schematic diagram of an exemplary implementation for control block 16, according to an embodiment of the invention. As depicted, control block 16 may comprise a comparator 50 and an AND gate 52. The control block 16 receives the PWM signal and the V_Q1 signal. Control block 16 may output the PWM signal as the control signal G_Q2 which is applied to the gate of switch 14. The comparator 50 compares the V_Q1 signal against a reference signal, and generates an output signal. The AND gate 52 receives the PWM signal and the output of comparator 50 at its input terminals. The AND gates 52 performs an AND operation on these signals to generate the control signal G_Q1, which is applied to the gate of switch 12.

Embodiments of the present invention can be used or implemented in commutating switching devices where current is transferred from one path to another in a periodic manner. One application for the present invention is in an uninterruptible power supply (UPS). For example, embodiments of the invention can be employed for UPS applications where higher efficiency of the boost converter translates to lower battery load current and longer working time of UPS in case of power interruption. Another application is for a fixed input voltage.

As described herein, embodiments of the present invention make possible true zero voltage switching (ZVS) for multiple switching devices employed in a power system. Embodiments of the present invention can eliminate the need for high voltage diodes (and thus, any attendant recovery current losses associated with such diodes). As such, embodiments of the present invention improve efficiency in a power system.

Although the present invention and its advantages have been described in detail, it should be understood that various changes, substitutions, and alterations can be made therein without departing from the spirit and scope of the invention as defined by the appended claims. That is, the discussion included in this application is intended to serve as a basic description. It should be understood that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Neither the description nor the terminology is intended to limit the scope of the claims.

What is claimed is:

1. A power converter system comprising:
   a first switch coupled between a first node and a second node, the first switch in a main power loop for delivering power to a first load;
   a second switch and a transformer coupled in series between the first node and the second node, the second switch in an auxiliary power loop for delivering power to a second load; and
   the transformer having a primary winding and a secondary winding, the primary winding for storing energy sufficient to provide zero voltage switching (ZVS) conditions for both the first and second switches during operation of the power converter system;
   wherein a magnetizing inductance of the primary winding resonates with a capacitance which is equal to the combination of a capacitance of the first switch and any additional or parasitic capacitance around the first switch;
   wherein the magnetizing inductance of the primary winding resonates with a capacitance which is equal to the combination of a capacitance of the second switch and any additional or parasitic capacitance around the second switch.

2. The power converter system of claim 1 comprising a control block for providing control signals to turn on and off the first and second switches.

3. The power converter system of claim 1 comprising:
   a first diode coupled between the first switch and the first load in the main power loop; and
   a second diode coupled between the second switch and the second load in the main power loop.

4. The power converter system of claim 3 wherein the first and second diodes each comprise a Schottky diode.

5. The power converter system of claim 1 wherein the first and second switches each comprise a transistor.

6. A power converter system comprising:
   a voltage source;
   a first switch connected to the voltage source and between a first node and a second node, the first switch operable to be turned on and turned off for delivering power to a first load;
   a second switch and a transformer coupled in series between the first node and the second node, the second switch operable to be turned on and turned off for delivering power to a second load; and
   the transformer having a primary winding and a secondary winding;
   wherein in one stage of operation for the power converter system, a magnetizing inductance of the primary winding resonates with a capacitance which is equal to the combination of a capacitance of the first switch and any additional or parasitic capacitance around the first switch;
   wherein in another stage of operation for the power converter system, a magnetizing inductance of the primary winding resonates with a capacitance which is equal to the combination of a capacitance of the second switch and any additional or parasitic capacitance around the second switch.

7. The power converter system of claim 6 comprising a control block for providing control signals to turn on and off the first and second switches.

8. The power converter system of claim 6 comprising:
   a first diode coupled between the first switch and the first load; and
   a second diode coupled between the second switch and the second load.

9. The power converter system of claim 8 wherein the first and second diodes each comprise a Schottky diode.

10. The power converter system of claim 6 wherein the first and second switches each comprise a transistor.

11. A power converter system comprising:
    a voltage source;
    a first switch coupled between a first node and a second node, the first switch operable to be turned on and turned off for delivering power to a first load;
    a second switch operable to be turned on and turned off for delivering power to a second load; and
    a transformer coupled in series with the second switch between the first and second nodes, the transformer having a primary winding and a secondary winding;
    wherein in one stage of operation for the power converter system, a magnetizing inductance of the primary winding resonates with a capacitance which is equal to the combination of a capacitance of the first switch and any additional or parasitic capacitance around the first switch to provide zero voltage switching (ZVS) conditions for the first switch during operation of the power converter system;

wherein in another stage of operation for the power converter system, the magnetizing inductance of the primary winding resonates with a capacitance which is equal to the combination of a capacitance of the second switch and any additional or parasitic capacitance around the second switch to provide zero voltage switching (ZVS) conditions for the second switch during operation of the power converter system.

12. The power converter system of claim 11 comprising a control block for providing control signals to turn on and off the first and second switches.

13. The power converter system of claim 11 comprising:
   a first diode coupled between the first switch and the first load; and
   a second diode coupled between the second switch and the second load.

14. The power converter system of claim 13 wherein the first and second diodes each comprise a Schottky diode.

15. The power converter system of claim 11 wherein the first and second switches each comprise a transistor.

* * * * *